July 26, 1966 L. W. DYER ETAL 3,263,042
ELECTRIC CONTROL DEVICE WITH ELECTRO-MAGNETIC
CONTACT-BIASING MEANS
Filed Feb. 18, 1963 5 Sheets-Sheet 1

WITNESSES:
John L. Chopp
James F. Young

INVENTORS
Lloyd W. Dyer and
James B. Wallace
BY
William A. Elchik
ATTORNEY

United States Patent Office 3,263,042
Patented July 26, 1966

3,263,042
ELECTRIC CONTROL DEVICE WITH ELECTROMAGNETIC CONTACT-BIASING MEANS
Lloyd W. Dyer and James B. Wallace, Beaver, Pa., assignors to Westinghouse Electric Corporation, Pittsburgh, Pa., a corporation of Pennsylvania
Filed Feb. 18, 1963, Ser. No. 259,146
4 Claims. (Cl. 200—87)

This invention relates generally to electric control devices and more particularly to electric switches of the type constructed such that the contacts will remain in the closed position upon the occurrence of overload current conditions until means other than the contact means operates to interrupt the circuit.

In electric control devices, whenever the path of the current deviates from a straight line in proximity to the closed contacts, magnetic forces tend to blow the contacts apart. Upon the occurrence of an overload or short circuit, these blow-off forces will, in some instances, operate to slightly separate the contacts whereupon pin point arcs generated between the contacts will operate to weld the contacts together. This welding of contacts is more likely to occur in electric control devices such as switches, wherein means other than the contact means operates to interrupt the circuit, because, in these devices, the contacts are in the closed position after the circuit is interrupted, and the closed contacts, which have been heated to a molten or flow state, cool and weld closed.

An object of this invention is to provide an improved electric switch with magnetic means for holding the contacts in the closed position wherein the holding force of the magnetic means is, within a certain range, directly proportional to, or varies with, the amount of current flowing through the contacts. Thus, the holding force of the magnetic means is not sufficient to interfere with manual operation of the switch under normal conditions and upon the occurrence of, for example, a short circuit, the high degree of holding force will operate to hold the contacts firmly together until means other than the contact means operates to interrupt the circuit.

Another object of this invention is to provide an improved electric switch having a switch arm that is pivotally movable to move a movable contact into butting engagement with a stationary contact, which switch comprises electrically energized magnetic means for holding the butt-type contacts in the closed position. When this type of switch is closed against an overload, the contacts are forced apart not only by the previously discussed magnetic forces; but also by the tendency of the contacts to rebound toward the open position. Thus, our invention has particular utility when embodied in this type of switch because the magnetic means operates immediately upon current flow to prevent rebound of the contacts.

As will be hereinafter described, in certain types of switches it is desirable to provide resilient contact pressure means that operate independently of the operating spring of a switch. For example, when a plurality of switch arms are mounted on a common tie bar in a multi-pole switch it is desirable to provide separate resilient contact pressure means in each pole unit in order to provide good contact alignment and adequate and generally uniform contact pressure. In this type of switch, the magnetic blow-off forces and contact rebound force can more easily overcome the relatively weak independent resilient contact pressure means to thereby force the contacts to the undesirable slightly open position.

An object of this invention is to provide an improved multi-pole switch having independent resilient contact pressure means in each pole with improved electromagnetic hold down means in each pole for holding the associated contacts in the closed position under overload current conditions.

Other objects of this invention are to provide switches constructed in accordance with each of the foregoing objects, each of which switches comprises fuse means for interrupting the overloaded circuit while the contacts are held firmly in the closed position by means of improved electromagnetic means.

A more general object of this invention is to provide an improved switch for controlling an electric circuit.

The novel features that are considered characteristic of the invention are set forth in particular in the appended claims. The invention itself, however, both as to structure and operation, together with additional objects and advantages thereof, will be best understood from the following detailed description thereof when read in conjunction with the accompanying drawings.

In said drawings.

Figure 2:
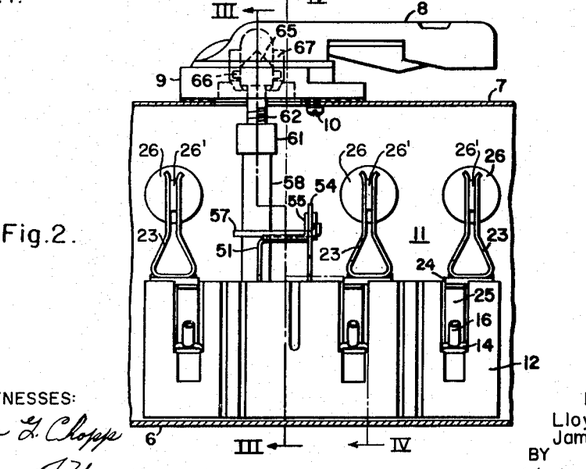
FIG. 2 is a reduced partial view, partly in section and partly in end elevation, showing the switch mounted within an enclosure.

Referring to the drawings, and particularly to FIG. 2, the structure shown therein comprises a sheet metal cabinet 6 having a cover 7 attached thereto by means of hinges (not shown). In the interest of simplicity, only a portion of the cabinet 6 is shown in the present drawings. An operating handle 8 is rotatably mounted on a hub 9 which may be attached to the outside of the cover 7 by means of screws 10 inserted into the hub 9. As will be more fully described hereinafter, the external handle 8 is utilized for operating a switch 11 that is mounted inside the cabinet 6. The handle 8 may be of the type fully described in the patent to J. O. Rexroad, Patent No. 2,806,099, issued September 10, 1957.

The switch 11 is of the general type described in the patent to A. R. Cellerini, Patent No. 2,849,555, issued August 26, 1958. As shown, the switch 11 comprises an insulating base 12 that is formed with a separate recess or compartment for the metal parts of each pole and a separate recess or compartment for the switch operating mechanism.

Figure 3:
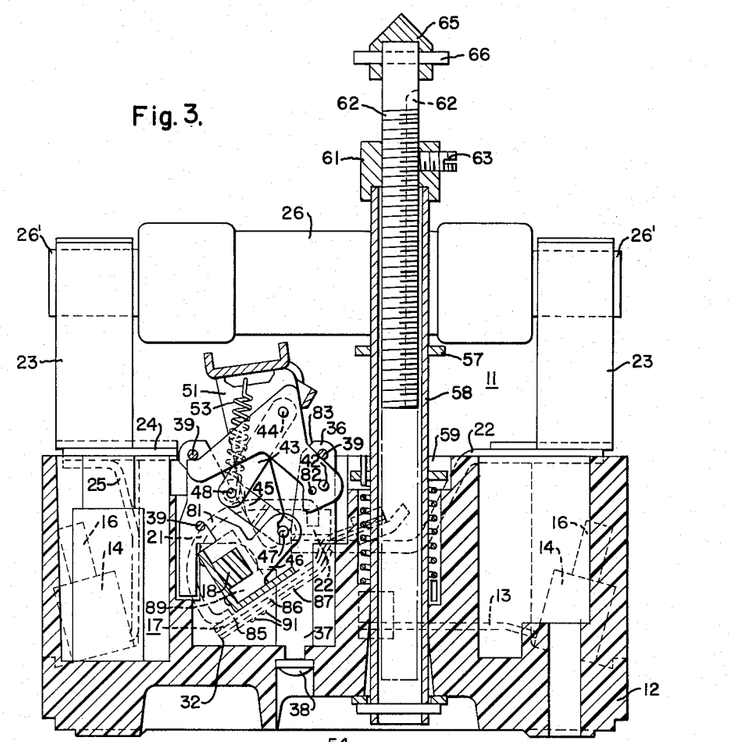
FIG. 3 is a sectional view, taken generally along the line III—III of FIG. 2.

Referring to FIG. 3, each pole of the switch 11 comprises a line terminal assembly which includes a conductor 13, a terminal clamp or collar 14 attached to the outer end of the conductor 13 for connecting a line conductor to the conductor 13, and a stationary contact 15 (FIGS. 5 and 6) secured to the inner end of the conductor 13. The collar 14 is provided with a threaded screw 16 for connecting a line conductor to the terminal. A switch arm indicated generally at 17 is secured to a tie bar 18 that is common to all of the pole units. The switch arms 17 and means for connecting the switch arms to the tie bar 18 will be hereinafter more specifically described. A movable contact member 19 (FIG. 6) is fixedly secured to the outer end of the switch arm 17. As will be described more fully hereinafter, the tie bar 18, which is rotatably mounted on the base 12 and disposed parallel to the base, is rotated by an operating mechanism to pivotally move the switch arms 17 to the open and closed positions.

A flexible conductor 21 is secured at one end to the inner end of the switch arm 17 and at the other end to one end of a conductor 22. A fuse clip 23 is attached to the other end of the conductor 22.

A load side fuse terminal or plate 24 is attached to the base 12. Another fuse clip 23 is removably attached to the plate 24. A load side terminal assembly which includes a collar 14 is electrically connected to the plate 24 by means of a conductor 25. The collar 14 is provided with a screw 16 for connecting a load conductor to the conductor 25. A fuse 26 is installed in the fuse clips 23. As is seen in FIGS. 1–3, the fuse 26 has conducting stabs 26' at each of its two opposite ends, which conducting stabs 26' fit into the clips 23.

Figure 1:
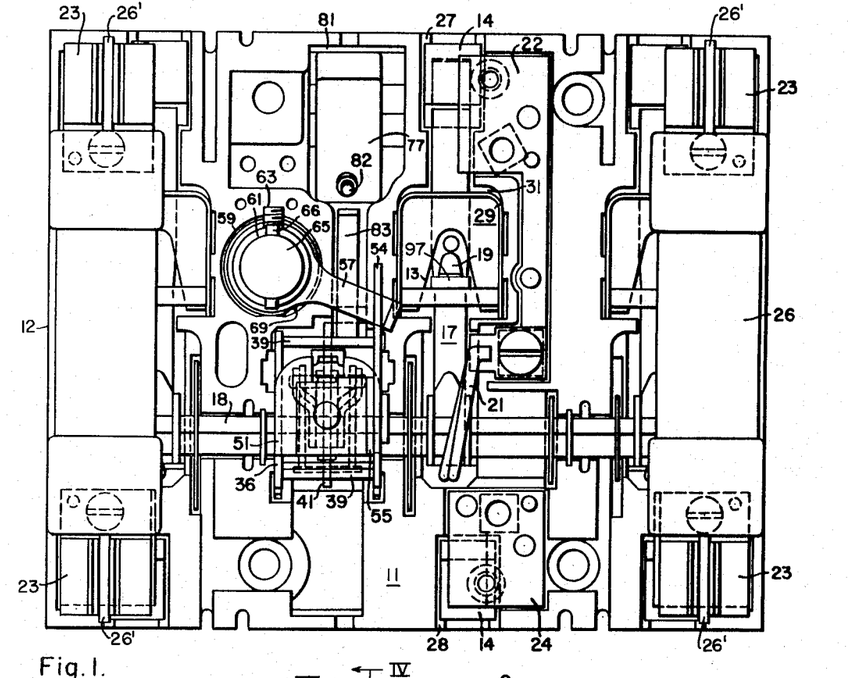
FIGURE 1 is a plan view of an electric switch embodying the principal features of this invention.

As is shown in FIG. 1, the line-side terminal assembly for each pole is disposed in a separate recess 27 in the base 12, and the load-side terminal assembly for each pole is disposed in a separate recess 28 in the base 12. An arc extinguishing structure 29, which comprises a plurality of magnetic plates 30 (FIG. 4) is disposed in a recess 31 (FIG. 1) in the base 12. As is seen in FIGS. 1 and 3, the actuating or operating mechanism is disposed in a separate recess 32 (FIG. 3) that is between (FIG. 1) two of the pole units of the switch.

Figure 4:
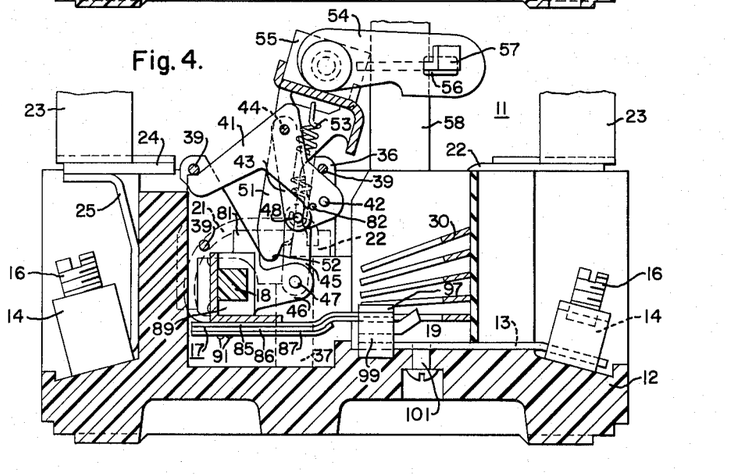
FIG. 4 is a sectional view taken generally along the line IV—IV of FIG. 2.

Referring to FIGS. 3 and 4, the operating mechanism is supported between a pair of spaced mounting plates 36. Each plate 36 is provided with an extension 37 that projects through an opening in the base 12 and is riveted at 38 (FIG. 3) to secure the plate to the base. The two supporting plates 36 are secured together by spacing studs 39. A cradle member 41 is supported between the plates 37 in a fixed position. One end of the cradle member 41 is attached to a stud 42 which stud is supported between the plates 36. As is shown in FIGS. 3 and 4, the other end of the cradle 41 is fixedly anchored under one of the studs 39. One end of a toggle link 43 is pivotally connected to the cradle member 41 by means of a pin 44. One end of another toggle link 45 is pivotally connected to a bracket 46 by means of a pin 47. The toggle links 43 and 45 are connected together by means of a knee pivot pin 48. The bracket 46 is rigidly secured to the tie bar 18 to rotate the tie bar 18 upon operation of the operating mechanism.

A generally U-shaped operating lever 51 is pivotally mounted on the mounting plates 36. As is seen in FIGS. 3 and 4, the U-shaped lever 51 is inverted and the inner ends of the opposite legs thereof are supported in rounded bottoms 52 (FIG. 4) in the mounting plates 36. Two overcenter springs 53, only one of which is shown, are connected, under tension, between the toggle pin 48 and the base of the inverted U-shaped operating lever 51. As is shown in FIG. 4, a link 54 is pivotally connected to a bracket 55 that is attached to the operating lever 51. The link 54 has an opening 56 therein through which one end of an operating arm 57 extends. The arm 57 is secured to a sleeve 58 which is rotatably mounted in an opening 59 (FIG. 3) in the base 12. The sleeve 58 is rotated to operate the switch mechanism in a manner that will be hereinafter more fully described.

As is shown in FIG. 3, an internally threaded member 61 is secured to the upper end of the sleeve 58. An operating shaft 62 is adjustably threaded into the member 61. Thus, the vertical height of the upper end of the shaft 62 may be adjusted in accordance with the depth of the enclosure in which the switch is mounted.

The shaft 62 is retained at the desired height by means of a set screw 63 which extends through the member 61 into a groove 64 in the shaft 62. A generally cone-shaped cap 65 is mounted on the upper end of the shaft 62, and a pin 66 extends through the cap 65 and the shaft 62. As is shown in FIG. 2, the cap 65 and the pin 66 are disposed in a recess 67 in the handle 8 when the cover 7 of the enclosure 6 is closed. Thus, the shaft 62 and the sleeve 58 may be rotated by means of the handle 8 to operate the enclosed switch. The vertically adjustable operating means is more fully described in the aforementioned patent to A. R. Cellerini, Patent No. 2,849,555.

The switch 11 is shown in FIG. 4 in the closed position. Referring to FIGS. 3 and 4, when the switch is in the closed position, the circuit through each of the pole units extends from a line conductor (not shown) through the conductor 13, the stationary contact 15 (FIG. 6), the movable contact 19 (FIG. 6), the switch arm 17, the flexible conductor 21, the conductor 22, the line fuse clip 23, the fuse 26, the load fuse clip 23, the conductor 25, to a load conductor (not shown) that would be connected to the conductor 25 by means of the load terminal connector 14, 16.

When it is desired to open the switch 11, the external operating handle 8 (FIG. 2) is rotated in a clockwise direction to rotate the sleeve 58 (FIG. 4) clockwise whereupon the arm 57 operates to move the link 54 to the left (FIG. 4). Movement of the link 54 to the left, moves the operating lever 51 counterclockwise from the position in which it is shown in FIG. 4 to the position in which it is shown in FIG. 3. During this movement, the line of action of the overcenter springs 53 is moved to the left of an imaginary line between the pivot pins 47, 44 whereupon the springs 53 operate, with a snap action, to move the knee pivot pin 48 of the toggle 43, 45 to the left, during which movement the toggle 43, 45 collapses to the position seen in FIG. 3. Collapse of the toggle 43, 45 rotates the bracket 46 and tie bar 18 in a counterclockwise direction to move the three switch arms counterclockwise from the closed position (FIG. 4) to the open position (FIG. 3) with a snap action. Opening movement of the operating mechanism of the switch is limited by the engagement of an extension 81 of the bracket 46 with one of the spacing studs 39 (FIG. 3). The springs 53, under tension, maintain the toggle 43, 45 collapsed and, therefore, the switch 11 in the open position until the switch is manually operated to the closed position.

The switch 11 is closed by counterclockwise rotation of the handle 8 (FIG. 2) to rotate the sleeve 58 (FIGS. 3 and 4) counterclockwise to move the link 54 to the right, which movement moves the operating lever 51 clockwise from the position in which it is seen in FIG. 3 to the position in which it is seen in FIG. 4. During this movement the overcenter springs 53 are operated to move the knee pin 48 of the toggle 43, 45 to the right to reset the toggle 43, 45. Resetting movement of the toggle 43, 45 moves the bracket 46 and tie bar 18 clockwise to pivot the switch arms 17 clockwise to the closed position seen in FIG. 4. A rigid stop 82 is provided on the member 41 to limit closing movement of the toggle 43, 45. Closing movement of the operating lever 51 is limited by the engagement of this member with a stop surface 83 (FIG. 3) on the bracket 36. The springs 53, under tension, maintain the toggle 43, 45 and therefore the switch 11 in the closed position until the switch is manually opened in the same manner hereinbefore described.

The switch 11 is non-automatic in that the switch is constructed only for manual operation and, the operating mechanism does not automatically operate upon the occurrence of overload current conditions to move the switch arms 17 to the opened position. Upon the occurrence of overload current conditions, the fuses 26 are provided to interrupt the circuit, in a well known manner.

Figures 5, 6, 7, 9:
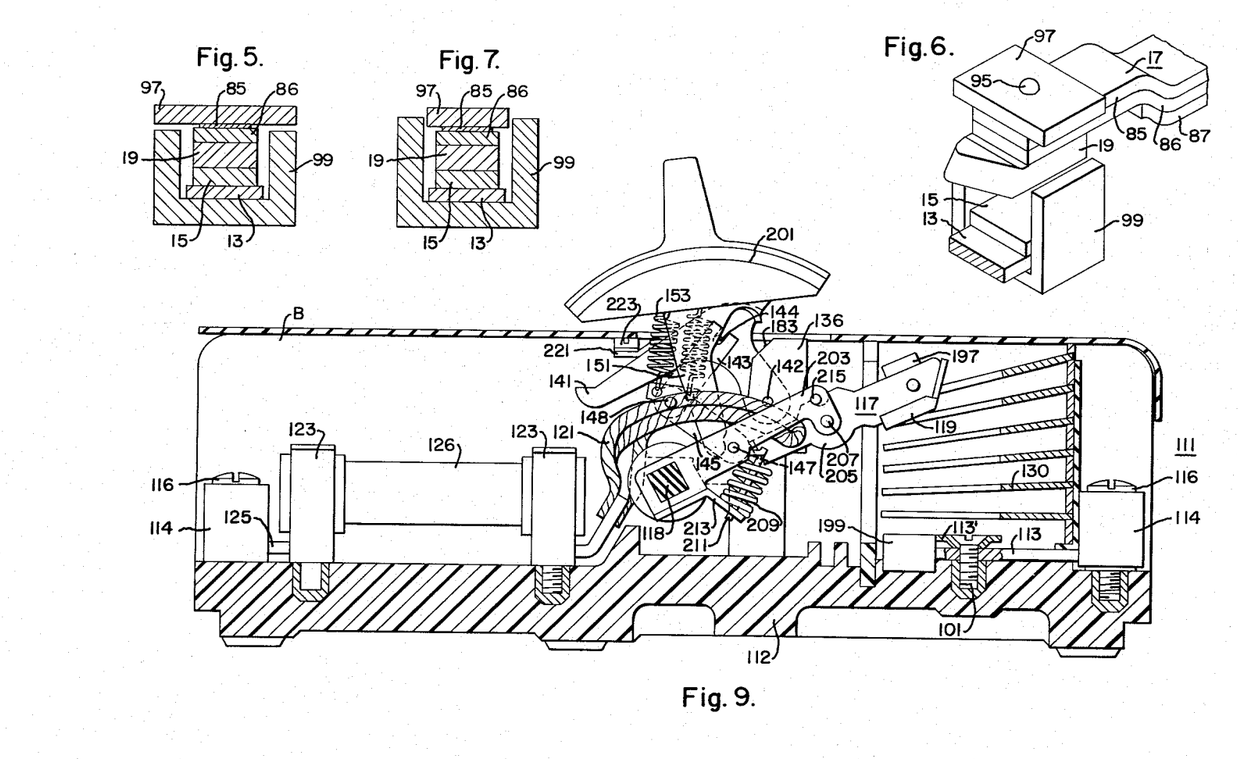
FIG. 5 is a sectional view of the closed contact structure taken generally along the line V—V of FIG. 4.
FIG. 6 is an exploded perspective view of the contact structure of FIG. 4.
FIG. 7 is a view similar to FIG. 5 illustrating a modified form of the contact structure of this invention.
FIG. 9 is a sectional view taken generally along the line IX—IX of FIG. 8.

Referring to FIGS. 3 and 4, it will be seen that each of the switch arms 17 comprises three resilient conductors 85, 86 and 87 that are riveted to the lower side of a bracket 89 by means of rivets 91. The bracket 89 is secured rigidly to the tie bar 18. As is seen in FIG. 6, the lower conductor 87 does not extend the full length of the switch arm. This lower conductor 87 is shorter because it is primarily a spring member.

As is seen in FIG. 6, the movable contact 19 is disposed beneath the conductor 86, and a rivet 95 passes through a magnetic member 97 and the conductors 85 and 86. The rivet 95 is recessed in the movable contact 19 and it secures the members 85, 86, 97 and 19 firmly together.

When the contacts are in the closed position, and an overload or short circuit occurs in the circuit to be produced by the switch 11, magnetic blow-off forces tend to force these contacts apart. If the contacts separate slightly, pin point arcs will be generated between the contacts, which arcs will operate to weld the contacts together. Magnetic means, which include the magnetic member 97 (FIG. 6) and a U-shaped magnetic member 99, are provided to firmly hold the contacts 15, 19 in the closed position under overload conditions. The members 97 and 99, are members of magnetically permeable material such as soft iron or steel. As is seen in FIG. 6, the member 97 is rigidly secured to the switch arm 17 on the side of the switch arm 17 that is opposite the side that supports the contact 19. The U-shaped magnetic member 99 is disposed in a suitable depression in the base 12 (FIG. 4) and it is held in place by means of a screw 101 that secures the conductor 13 to the base 12. The screw 101 biases the conductor 13 against the magnetic member 99 to thereby bias the magnetic member 99 against the base 12. The electromagnet 97, 99 is energized by the current flowing through the conductor 13, contacts 15, 19, and switch arm 17. The flux generated in the magnetic circuit through the members 99 and 97 operates to hold these members together to thereby hold the contacts 15, 19 in the closed position. The magnetic holding force is directly proportional to the amount of current that energizes the electro-magnet. Under ordinary current conditions, the magnetic holding force is not strong enough to interfere with manual operation of the switch, and upon the occurrence of, for example, a short circuit, the magnetic holding force is strong enough to offset the magnetic blow-off forces that would otherwise tend to separate the contacts. Thus, the contacts 15, 17 are held firmly closed until the fuse means 26, or other suitable means other than the contact means, operates to interrupt the circuit.

When butt-type contacts are rapidly moved into butting engagement, there is a tendency of the contacts to rebound toward the open position at the instant that the contacts are slammed closed. If a switch comprising butt-type contacts is closed on an overload, the magnetic blow-off forces and the force or tendency of the contacts to rebound are cumulative in that they both tend to separate the contacts. The electro-magnetic hold-down means of this invention operates immediately upon current flow to offset both the magnetic blow-off forces and the contact rebound force to hold the contacts in firm engagement when they are slammed closed. Thus, the improved switch of this invention can be closed against relatively high overloads with relatively less damage to the contacts. This will be more apparent in view of test results that are hereinafter set forth.

When a plurality of switch arms are mounted on a common tie bar that is controlled by a single operating mechanism, it is desirable, because of limitations in manufacturing tolerances, to provide separate resilient contact pressure means in each pole unit in order to have adequate and generally uniform contact pressure in the plurality of pole units. This is particularly true in a switch of the type shown in FIGS. 1–6 (and also in a switch of the type shown in FIGS. 8–9) wherein the operating mechanism is stopped in a positive final position that is determined by rigid stop means. Referring to FIG. 4, it can be seen that the springs 53, under tension, are pulling the knee pivot 48 to pull the toggle 43, 45 to a slightly overset position. Further collapsing movement of the toggle 43, 45 is prevented by engagement of the rigid toggle member 43 with the rigid stop member 82. It can be understood that in a commercial manufacturing operation it would be impractical to attempt to have this stop means alone determine the final positive position of the contacts in the closed position and also determine the amount of contact pressure. Thus, separate resilient contact pressure means is provided in each pole unit. The electromagnetic hold-down means of this invention serves to prevent the magnetic blow-off forces and contact rebound force from operating against the resilient contact pressure means to force the contacts open under overload conditions.

As was previously described, the resilient contact pressure means in the switch 11 comprises the resilient switch arms 17. Each switch arm 17 comprises three resilient conductors 85, 86, and 87. The position of parts in the closed position is such that the resilient switch arms 17 are flexed to a charged condition. Thus, the tendency of the switch arms 17 to unflex provides contact pressure between the closed contacts. The electromagnet 97, 99 in each pole unit serves to prevent the magnetic blow-off forces and contact rebound force from flexing the associated flexible switch arm 17 in a counterclockwise direction toward the open position to thereby prevent the aforementioned welding of contacts under overload conditions. It is to be noted that the magnetic flux in the magnetic circuit through the members 99 and 97 surrounds the contacts to hold these contacts in the closed position. As long as the contacts are held in the closed position by means of this electromagnet which is positioned in close proximity to the contacts, the magnetic blow-off forces and contact rebound force will not effectively operate against the flexible switch arms.

A test was conducted with a switch of the general type disclosed in FIGS. 1–4, which switch did not include the electromagnet 97, 99. The switch, which was designed to carry a normal current of 60 amperes, was closed on an overload of 6100 amperes (Peak) alternating current. During this closing operation, the contacts of the switch welded shut. With some effort, the contacts were broken loose by operation of the operating handle; but it was found that the contacts were burned to such a degree that they could not thereafter be used, and the entire area around the contacts was so burned that the switch could not even be used by merely replacing the contacts. Thereafter, the same type of switch, with the improved electromagnetic hold-down means, was closed on a 6100 ampere (Peak) alternating current and the contacts did not weld. There were negligible burn marks on the contacts and the switch and contacts were still in good condition for effective use. The switch was then closed on 12,000 amperes (Peak) alternating current and the contacts did not weld. There were slight burn marks on the contacts, and the contacts and switch were still in condition for effective use. The switch was then closed on 15,000 amperes (Peak) alternating current and the contacts did not weld. There were only four 1/16 inch diameter burn marks on the stationary contact. The switch and contacts were still in condition for effective use after this test.

As is seen in FIGS. 5 and 6, in the first embodiment of the invention the magnetic member 97 extends out over the pole faces of the U-shaped magnetic member 99 and is slightly spaced therefrom. As is seen in FIG. 7, the structure could be so modified that the member 97, in the closed position, would be disposed partially within and between the legs of the member 99.

As was hereinbefore described, the independent resilient contact pressure means in each pole unit of the switch 11 (FIGS. 1–6) comprises the resilient flexible switch arm 17. In another embodiment of the invention (FIGS. 8–10) a modified form of independent resilient contact pressure means is used.

Figure 8:
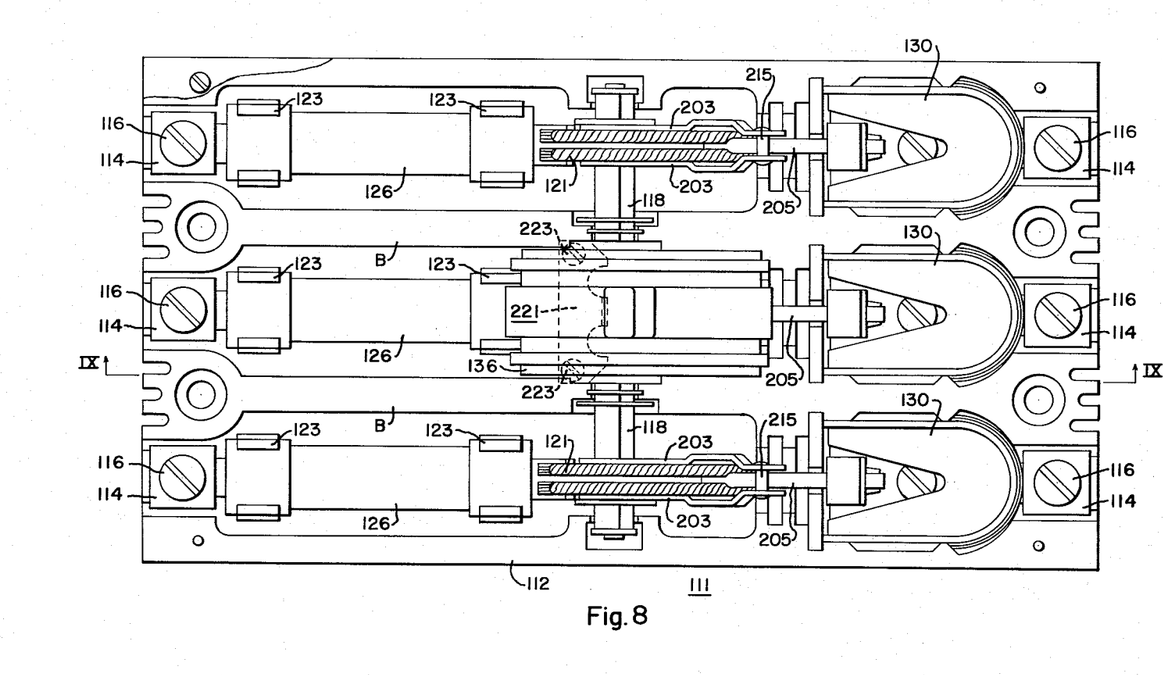
FIG. 8 is a plan view, with parts broken away, of an electric switch comprising another embodiment of the invention.
Figure 10:
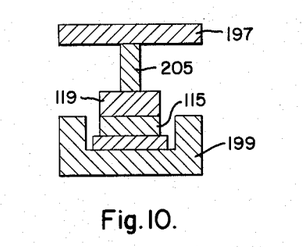
FIG. 10 is a sectional view of the contact structure of FIGS. 8 and 9 when the contacts are in the closed position.

Referring to FIGS. 8–10, many parts of the switch shown therein are similar in construction and operation to the parts of the switch 11 shown in FIGS. 1–6. Thus, reference characters that are applied to these similar parts are the same as the like parts of the first embodiment except that they are preceded by the digit 1. Referring to FIGS. 8 and 9, it will be seen that the insulating base 112 is molded with three adjacent recessed portions that are separated by insulating barriers B. Each of the depressions of the base 112 supports the current carrying parts of one of the three pole units of the switch 111. The operating mechanism of the switch is disposed in the center pole unit. The operating lever 151 (FIG. 9) is controlled by means of an insulating handle structure 201. Independent resilient contact pressure is achieved in each pole unit by means of the construction of the switch arm 117. The switch arm 117 is a two part switch arm. One of the parts 203 is a contact supporting arm that is rigid and is rigidly connected to the tie bar 118. As can be seen in FIG. 8, each of the contact supporting arms 203 comprises two spaced twin members. A contact carrying arm 205 which is a rigid member, is pivotally supported by means of a pivot pin 207 on the outer end of the contact supporting arm 203. The contact carrying arm 205 is partially disposed between the two twin members of the contact supporting arm 203. A compression spring 209 is disposed over a rod 211 and supported between a spring support 213, which spring support is fixedly supported on the inner end of the contact supporting arm, and the inner end of the contact carrying arm 205. The spring 209 is provided to bias the contact carrying arm 205 about the contact supporting arm 203 in a clockwise direction to provide for contact pressure and alignment when the contacts are in the closed position. A pin 215 is supported between the twin members of the contact supporting arm 203 in order to limit pivotal movement of the contact carrying arm 205 in both directions.

The cradle member 141 is fixedly held from rotating about the pivot 142 under the force of the over-center springs 153 by means of a bracket 221 that is supported on the supporting plates 136 by means of screws 223.

Referring to FIG. 9, when the switch 111 is in the closed position, the circuit in each pole unit extends from the line terminal 114 through the conductor 125, the fuse clip 123, the fuse 126, the fuse clip 123, the flexible conductor 121, the contact carrying arm 205, the movable contact 119, the stationary contact 115 (FIG. 10), the conductor 113', the conductor 113, to the load terminal 114.

The switch 111 is shown in the open position in FIG. 9. In order to close the switch, the insulating handle structure 201 is manually operated to rotate the operating lever 151 in a clockwise direction. This moves the line of action of the overcenter springs 153 to the right whereupon the overcenter springs 153 operate to move the knee pivot pin 148 to the right to move the toggle to the closed position with a snap action. During this movement, since the pivot 147 of the lower toggle link 145 is attached to the contact supporting arm 203, the contact supporting arm 203 and therefore the switch arm 117 and tie bar 118 are moved to the closed position with a snap action. Since all of the switch arms 117 are connected to the common tie bar 118, this movement simultaneously moves all of the switch arms 117 to the closed position. The toggle 143, 145, in the closed position, is overset in that the knee pivot 148 is to the right of a line drawn between the pivots 144, 147 in the same general manner as the similar toggle of the switch seen in FIG. 4. Closing movement of the toggle 143, 145 is limited by engagement of the toggle link 145 with the pin 142.

The final closed position of the contact supporting arm 203 is a position which forces the contact carrying arm 205 in a counterclockwise direction relative to the contact supporting arm 203 whereupon the inner end of the contact carrying arm 205 compresses the spring 209. Thus, in each pole unit, the spring 209 biasing the contact carrying arm 205 in a clockwise direction about the contact supporting arm 203 provides for the independent resilient contact pressure means. The magnetic members 197, 199 operate in the same manner as the members 97, 99 hereinbefore described to prevent the magnetic blow-off forces and contact rebound forces from operating against the spring 209 in a manner that would effect slight separation of the contacts 119, 115 to thereby prevent the welding of contacts when an overload passes through the switch 111 and also when the switch 111 is closed on an overload. Upon the occurrence of an overload of a predetermined value the contacts 119, 115 will be held firmly in the closed position and the fuse means 126 will operate to interrupt the circuit.

Figure 11:
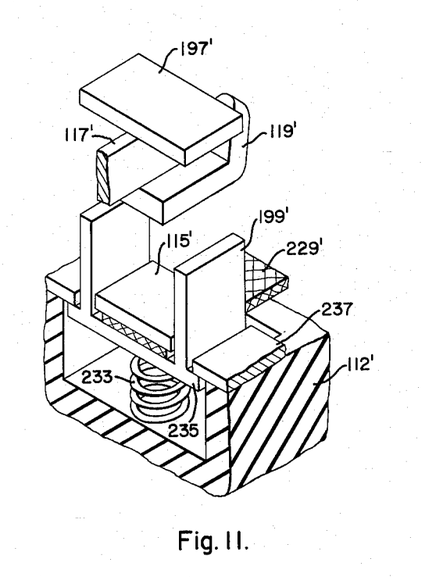
FIG. 11 is an exploded perspective view of a contact structure illustrating another embodiment of the invention.

Referring to FIG. 11, another embodiment of the invention is shown therein. This embodiment could be used in either of the switches 11 or 111 previously described. As can be seen in FIG. 11, the independent resilient contact pressure means in each pole unit of the switch comprises a rigid contact arm and a stationary contact structure that is spring biased upwardly to provide contact pressure. Since the stationary contact structure is relatively movable for contact pressure, a flexible conductor 229 is provided to carry current from the stationary contact 115' to a terminal such as the terminal 114 (FIG. 9). A spring 233 is disposed between the base 112' and the lower side of the magnetic member 199' to bias the magnetic member 199', and contact 115' upwardly, which movement is limited by the engagement of projections 235 on the magnetic member 199 with stop means 237 formed on the base 112'. When the movable contact arm 117' is brought into the closed position, the final position thereof is a position which holds the spring 233 under compression. Thus, independent resilient contact pressure means is provided in each of the pole units of the switch. The magnetic members 197' and 199' operate in essentially the same way except that, since the rigid contact arm 117' is stopped in a final predetermined position in the same manner as that previously described with respect to the switches 11 and 111, the stationary contact structure is movable, to some extent, in order to provide for the independent resilient contact pressure means. The magnetic circuit through the members 199', 197' prevents the magnetic blow-off forces and contact rebound force from moving the stationary contact structure against the bias of the spring 233 to a slightly open position to thereby prevent welding of the contacts when the switch is closed on an overload or when an overload current passes through the switch that is in the closed position.

In the switches herein disclosed and described, fuse means that are part of the switch are used to interrupt the circuit while the contacts are held in the closed position by means of the electromagnetic means. It is to be understood, however, that the switches could be constructed without the fuses therein and that the fuses or other circuit interrupting protective means could comprise a structure that is separate from the switch structure.

Referring to FIGS. 3, 4 and 9, it will be understood that the switches are non-automatic in that the operating mechanisms are not automatically released by trip means to open the contacts under overload conditions. The cradle 41 (FIG. 4) is fixedly held from rotating clockwise, under the force of the springs 53, by the stationary pin 39. The cradle 141 (FIG. 9) is likewise fixedly held from rotating clockwise by the stationary bracket 221. A standard type automatic circuit breaker comprises an operating mechanism similar to the mechanisms seen in FIGS. 4 and 9. In these automatic circuit breakers the cradle, such as the cradles 41 and 141, is held in a latched position by trip means which trip means operates automatically upon the occurrence of an overload above a predetermined value, to release the cradle. When released, the cradle is rotated clockwise, under the force of the operating springs, to effect collapse of the toggle and opening of the contacts. This type of operation is described, for example, in the patents to H. D. Dorfman et al., Patent No. 2,458,151 and to A. R. Cellerini Patent No. 2,866,027. The force of the electromagnetic means of this invention is, so strong under short circuit conditions that it would hold the contacts of a similar automatic circuit breaker closed against the opening force of the operating springs, which springs are constructed to exert a spring force that is light enough to enable practical manual operation of the breaker.

From the foregoing, it will be apparent that we have provided an improved switch with electromagetic means responsive to current flow operating to offset magnetic blow-off forces to thereby hold the contacts of the switch firmly closed until means other than the contact means operates to interrupt the circuit. In the embodiments shown, fuse means are provided for circuit interruption. When the butt-type contacts are closed against an overload, the electromagnetic means, which operates immediately upon current flow, serves to offset both the magnetic blow-off forces and the contact rebound force so that the switch can be closed on a relatively high overload with relatively less damage to the contacts. In switches such as those disclosed, wherein the final position of the operating mechanism is determined by rigid stop members and by over-center spring means which bias the rigid stop members into engagement, it is desirable to provide separate resilient contact pressure means in each pole unit to provide good contact alignment and adequate and generally uniform contact pressure. The separate resilient contact pressure means is disclosed in the first embodiment as a flexible resilient switch arm (FIGS. 1–6); in the second embodiment as a switch arm comprising two rigid parts pivotally connected with the contact carrying arm spring biased about the supporting arm (FIGS. 8–10); and in the third embodiment as a rigid switch arm with a spring biased stationary contact structure. In this type of switch, the magnetic blow-off forces and contact rebound force can more easily overcome the relatively weak independent resilient contact pressure means to thereby force the contacts to the undesirable slightly open position. With the provision of the electromagnet in close proximity to the contacts, we have provided a novel switch having the desirable independent resilient contact pressure means in each pole, which switch can be subjected to severe overload conditions with considerably less damage to the contacts. Since means other than the contact means operates to interrupt the overloaded circuit, the electromagnetic hold-down means can be constructed to supply a very strong holding force under overload conditions to provide increased reliability. Moreover, since the operating mechanism is not an automatic tripping mechanism, this mechanism need not be constructed to overcome the holding force of the electromagnetic hold-down means under short circuit conditions, and, therefore, the operating mechanism can be constructed for relatively easy manual operation.

Since numerous changes may be made in the above-described construction and different embodiment of the invention may be made without departing from the spirit and scope thereof, it is intended that all matter contained in the foregoing description or shown in the accompanying drawings shall be interpreted as illustrative and not in a limiting sense.

We claim as our invention:

1. A multi-pole switch for controlling a multi-phase electric circuit, each of said poles comprising a stationary contact and a switch arm structure, each of said switch arm structures comprising a movable contact a tie bar common to all of said poles, each of said switch arm structures being supported at one end thereof on said tie bar and comprising a contact in proximity to the other end thereof, a non-automatic operating structure manually operable to move said tie bar to thereby move all of said switch arm structures into and out of butting engagement with said stationary contacts, electromagnetic means for each pole comprising a stationary magnetic member supported in proximity to the associated stationary contact, separate resilient means in each pole biasing the associated stationary contact and stationary magnetic members generally toward the associated movable contact to provide contact pressure in the closed position, each of said electromagnetic means comprising a movable magnetic member supported on the associated switch arm, in each pole said stationary and movable magnetic members being disposed on opposite sides of the associated closed contacts, each of said electromagnetic means operating when said switch is closed on an overload to offset magnetic blow-off forces and to offset contact rebound forces which forces tend to separate said contacts whereby when said switch is closed on an overload said contacts are more firmly held in the closed position while said overload persists.

2. A multi-pole switch comprising a stationary contact for each pole, a tie bar common to all of said poles, each pole comprising a switch arm structure comprising a switch arm connected at one end to said tie bar, a movable contact fixedly disposed on each switch arm in proximity to the other end thereof, a non-automatic operating mechanism comprising a toggle operatively connected to operatively move said tie bar and switch arm structures, overcenter spring means biasing said toggle to a collapsed condition to maintain said switch arm structures in an open position, manually operable means operable to move said overcenter spring means to a position where said overcenter spring means operates to move said toggle to at least a dead-center position during which movement said tie bar and said switch arm structures are moved to move each of said movable contacts into butting engagement with one of said stationary contacts, when said switch arm structures are in the closed position said overcenter spring means biasing said toggle and switch arm structures into a closed position, stop means determining said closed position of said toggle and switch arm structures, each of said switch arm structures comprising resilient contact pressure means operating when said toggle and switch arm structures are in said closed position determined by said stop means to bias the associated movable contact against the associated stationary contact, and electromagnetic means in each pole unit disposed in close proximity to the associated closed contacts to hold the associated closed contacts together upon the occurrence of overload current conditions until means other than the contact means operates to interrupt the overloaded circuit.

3. A multi-pole switch comprising a stationary contact for each pole, a tie bar common to all of said poles, each pole comprising a switch arm structure comprising a switch arm connected to said tie bar, a movable contact fixedly disposed on each switch arm, a non-automatic operating mechanism comprising a toggle operatively connected to said tie bar, spring means biasing said toggle to a collapsed underset position to maintain said tie bar and switch arm structures in an open position, manually operable means operable to move said spring means to a position where said spring means operates to move said toggle to a more straightened position during which movement said tie bar and said switch arm structures are moved to move each of said movable contacts into abutting engagement with a different one of said stationary contacts, stop means limiting the closing movement of said operating mechanism, resilient means in each pole biasing the associated stationary contact against the associated movable contact to provide contact pressure, electromagnetic means in each pole comprising a first magnetic member disposed on said switch arm and a second magnetic member disposed on the side of the associated stationary contact that is opposite the side that engages the movable contact, and said electromagnetic means operating upon the occurrence of overload current conditions to oppose movement of the stationary contacts away from the switch arms so long as said overload persists.

4. A switch comprising a base, a stationary butt contact mounted on the base, a pivotally movable switch member, a non-automatic operating mechanism connected to one portion of said movable switch member for pivotally moving said movable switch member between open and closed positions, said operating mechanism holding said movable switch member in the closed position during the occurrence of overloads while said overloads persist, a movable contact mounted on said movable switch member, said movable contact making butt engagement with said stationary butt contact when said pivotally movable switch member is in the closed position, means providing resilience and relative movement between said movable contact and the portion of said movable switch member connected to said operating mechanism and applying butt contact pressure between said stationary and movable contacts when said switch member is in the closed position, magnetic means comprising a member of magnetic material mounted on said base and energized by the current flow through said contacts, said member of magnetic material acting to apply a force to said movable contact opposing movement of said movable contact relative to said portion of said switch member connected to said operating mechanism so that the force opposing separation of the butt engagement of said movable contact with said stationary contact during the occurrence of overloads comprises the force exerted by said means providing resilience plus the force of said magnetic means energized by the current flow.

References Cited by the Examiner
UNITED STATES PATENTS

| | | | |
|---|---|---|---|
| Re. 18,630 | 10/1932 | Van Sickle | 200—87 |
| 1,186,770 | 6/1916 | Hallock | 200—87 |
| 1,480,970 | 1/1924 | Trencham et al. | 200—87 |
| 1,764,369 | 6/1930 | Van Sickle | 200—87 |
| 1,918,232 | 7/1938 | Baker et al. | 200—87 |
| 2,182,864 | 12/1939 | Frank | 200—87 |
| 2,283,748 | 5/1942 | Mathieu | 200—87 |
| 2,284,437 | 5/1942 | Lake | 200—67 |
| 2,467,720 | 4/1949 | Austin | 200—87 |
| 2,546,016 | 3/1951 | Sandin et al. | 200—87 |
| 2,679,561 | 5/1954 | Thompson | 200—87 |
| 2,814,764 | 11/1957 | De Fligue et al. | 200—87 |
| 2,828,380 | 3/1958 | Lingal | 200—87 |
| 2,849,555 | 8/1958 | Cellerini | 200—50 |
| 2,963,560 | 12/1960 | Koerner et al. | 200—48 |
| 3,009,037 | 11/1961 | Jones et al. | 200—114 |
| 3,009,038 | 11/1961 | Dorfman et al. | 200—114 |
| 3,065,317 | 11/1962 | Streater | 200—87 |
| 3,077,525 | 2/1963 | Dyer | 200—114 |

BERNARD A. GILHEANY, *Primary Examiner.*

J. J. BAKER, *Assistant Examiner.*